United States Patent Office 3,271,422
Patented Sept. 6, 1966

3,271,422
DIRECT-DYEING DIANTHRAQUINONYL
SULFONIC ACID DYESTUFFS
Leon Katz, Springfield, and Wilhelm Schmidt-Nickels, Little York, N.J., assignors to General Aniline & Film Corporation, New York, N.Y., a corporation of Delaware
No Drawing. Filed Dec. 18, 1964, Ser. No. 419,586
6 Claims. (Cl. 260—368)

This application is a continuation-in-part of our applications Serial Nos. 79,144 and 79,167, both filed December 29, 1960, and both now abandoned.

This invention relates to novel dyestuffs, and more particularly to novel direct-dyeing dyestuffs of the anthraquinone series, and methods for making such dyestuffs.

In accordance with this invention, we have discovered the novel dyestuffs of the formula (I)
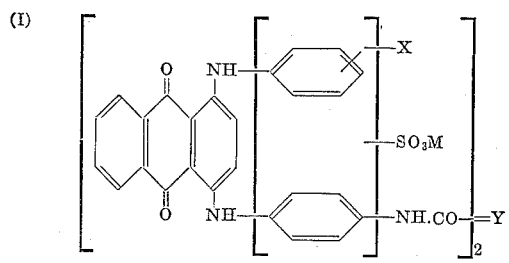

wherein X is selected from the group consisting of H, lower alkyl, lower alkoxy, and halogen; M is selected from the group consisting of H and alkali metal; Y is the organic residue of an organic dicarboxylic acid; and the $SO_3M$ group is bonded to one of the bracketed benzene rings by sulfonation of the intermediate of the formula (II)
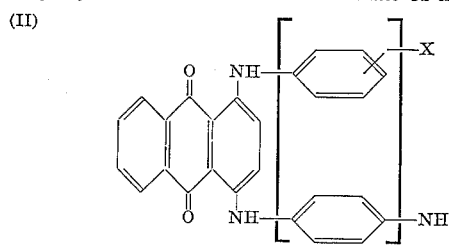

These dyestuffs are valuable direct-dyeing dyestuffs yielding on natural and regenerated cellulose such as cotton and rayon fibers and other cellulosic articles green shades of good fastness properties, particularly to light and anticrease resin treatments.

In the above formula, lower alkyl includes methyl, ethyl and the like, lower alkoxy includes methoxy, ethoxy and the like, halogen includes fluorine, iodine, and preferably chlorine and bromine, and alkali metal includes lithium, and preferably sodium and potassium. It will be understood that the anthraquinone nucleus may contain inert substituents such as the above-described lower alkyl and lower alkoxy groups.

Y in the above formula is the organic residue of an organic dicarboxylic acid, and may be any divalent saturated or unsaturated aliphatic, aromatic or heterocyclic moiety preferably having a molecular weight less than about 200. As examples of such organic dicarboxylic acids (HOOC—Y—COOH)

there may be mentioned oxalic, maleic, malonic, fumaric, citraconic, adipic, butadiene-1,4-dicarboxylic, cumidic, isophthalic, terephthalic, azobenzoic, benzophenone-dicarboxylic, acetone-dicarboxylic, acetone-diacetic, cinnamiccarboxylic, diglycolic, pyridine-dicarboxylic, diphenic, diphenyl-carboxylic, succinic, isosuccinic, mesaconic, naphthalene-dicarboxylic, pyrotartaric, uvitic, 4,4'-oxo-bis-benzoic acid including stereoisomeric forms and mixtures thereof and the like.

In accordance with this invention, dyestuffs of the above Formula I are prepared by reacting one mole of an organic dicarboxylic acid in the form of its dihalide (Hal—CO—Y—CO—Hal)

such as the dichloride or dibromide, with two moles of a sulfonated intermediate of the above Formula II in an aqueous medium at a temperature of about —3 to +30° C. and a pH of about 7–11.5. Those dicarboxylic acid halides which are solid at said temperatures are employed in the form of their solutions in an inert relatively low boiling organic solvent such as chlorobenzene, chloroform, carbon tetrachloride, benzene or acetone which is removed by distillation upon completion of the reaction.

The pH of the reaction medium is maintained within the above range by addition of the known inorganic acid binding agents such as the oxides, hydroxides, carbonates, bicarbonates, acetates, and borates of lithium, sodium and potassium, the oxides, hydroxides and carbonates of calcium and magnesium, etc. Such agents may be added at the beginning or preferably intermittently with the dicarboxylic acid halide during the reaction as hydrogen halide is split off.

Following completion of the reaction, the dyestuff is precipitated from the reaction medium by salting out followed by filtration, washing and drying.

The intermediates of the above Formula II may be prepared by first reacting a compound of the formula (III)
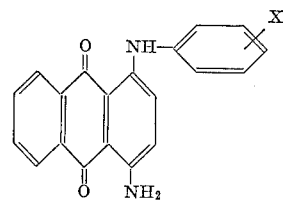

wherein X has the values given above, with an equimolar amount of a 4-nitro-1-halobenzene such as 4-nitro-1-chlorobenzene or 4-nitro-1-bromobenzene in the presence of an acid binding agent and a copper catalyst in an inert organic solvent at a temperature of about 150–220° C. to produce a compound of the formula (IV)
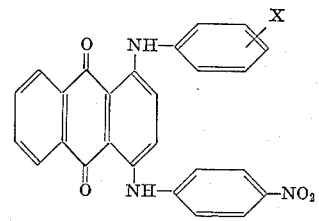

Compound III is readily prepared by reacting aniline or an X-substituted aniline with bromamine acid (1-amino-4-bromoanthraquinone-2-sulfonic acid), and then desulfonating the resulting compound in known manner as by treatment with Cerelose and alkali (caustic soda or potash). In this reaction involving Compound III, any of the usual acid binding agents may be employed, those of the inorganic type referred to above being preferred. Any copper compound, or metallic copper, may be employed as catalyst. To facilitate the reaction, the inert organic solvent should boil within or above the desired temperature range of 150–220° C. Examples of suitable solvents include nitrobenzene, dichlorobenzene, trichlorobenzene, chloronaphthalene, etc.

Compound IV is then subjected to the action of a reducing agent to reduce the nitro group to an amino group.

According to the preferred manner, this reduction is carried out by the action of sodium sulfide in alcohol at reflux temperatures, although any other suitable reducing means may be employed whereby a compound of the above Formula II is produced.

Compound II is then monosulfonated in known manner. The preferred method involves subjecting Compound II to the action of sulfuric acid of at least 96% concentration, including oleum, at temperatures of about 60–120° C. To insure sulfonation of all the molecules of Compound II, it is preferred to carry the sulfonation slightly past the monosulfonic acid stage, whereby a relatively minor proportion of such molecules are disulfonated in one or both of the bracketed benzene nuclei.

The invention is illustrated by the following examples which are not intended to be in any way limitative. All parts and proportions referred to herein and in the appended claims are by weight unless otherwise indicated.

*Example 1*

(a) A charge of 50 parts by volume 100% $H_2SO_4$, 5 parts by weight of 1-phenylamino-4-(4'-aminophenylamino)-anthraquinone, was stirred at 100° C. for 1 hour. It was then cooled to 20° C. and poured under agitation into 1000 parts of ice and water. The sulfonation product precipitated. It was filtered off and washed with water until the filtrate began to run with color. The filtrate then ran neutral. When the cake had the consistency of a paste the filtration was stopped and the paste was stored in a closed container. Weight obtained=61.2 parts by weight of 9.5% paste=5.8 parts by weight equivalent to 97% of the theory of the compound of the formula:

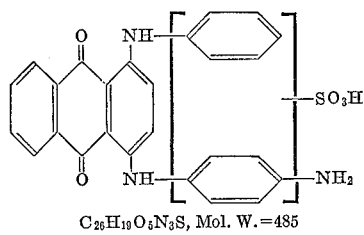

$C_{26}H_{19}O_5N_3S$, Mol. W.=485

Found: S=7.7%. Theory $C_{26}H_{19}O_5N_3S$: S=6.6%.

(b) A container equipped with a pH meter, an agitator and a thermometer was charged with 300 parts of water, 25.5 parts by weight of 9.5% aqueous paste of monosulfonated 1 - phenylamino - 4 - (4' - aminophenylamino)-anthraquinone (=2.42 parts 100%), prepared as described in (a) above. The pH was adjusted to 9 by adding 5% sodium hydroxide solution under agitation. Then the charge was cooled to 0–5° C.

At this temperature range, 1.53 parts by weight of fumaryl chloride was added alternatingly with 5% sodium hydroxide solution in such a way that a pH range of 8–10 was maintained. It took two hours to add all the fumaryl chloride. The charge was stirred at 0–5° C. for 3 hours more, adding from time to time more 5% sodium hydroxide solution to prevent the pH from falling below 8. These pH adjustments to hold the range 8–10 were continued for 15 hours after removal of the cooling bath allowing the charge to go up to room temperature. The completion of the reaction can be tested by making a dyeing on cotton and adding to the dyed cotton in water a little dilute sulfuric acid. If the dyeing remains green the reaction is complete. If the shade turns bluish there is still unreacted intermediate left and more fumaryl chloride should be added under the specified conditions.

The reaction having been completed the pH was 9.7. The dyestuff was precipitated by the addition of sodium chloride. The precipitated dyestuff was filtered off. The filtrate ran colorless. The dyestuff cake was washed with cold water for removal of salt until the filtrate ran with green color. Finally the dyestuff was dried. It has the formula

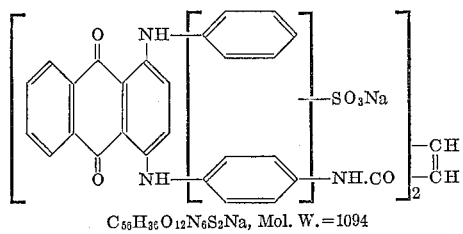

$C_{56}H_{36}O_{12}N_6S_2Na$, Mol. W.=1094

Weight obtained=2.6 parts by weight equivalent to 95% of the theory. The product dyes cotton directly in green shades. Resin treated dyeings (urea and formaldehyde) change only a little bluer and brighter with little loss in strength and have good lightfastness (about 30 hours in the fadeometer). Corresponding dyeings on rayon are even stronger and brighter and of equal to better lightfastness (about 40 hours in the fadeometer).

*Example 2*

(a) A charge of 150 parts by volume 100% $H_2SO_4$, 15 parts by weight of 1-(p-toluidino)-4-(4'-aminophenylamino)anthraquinone was stirred at 100° C. for 3½ hours. After allowing to cool to room temperature the charge was poured under agitation into 3000 parts of ice and water. The sulfonation product precipitated. It was filtered off and washed with water until the filtrate began to run with color. The filtrate then ran neutral. When the cake had the consistency of a paste the filtration was stopped and the paste was stored in a closed container. Weight obtained—66.8 parts by weight of 24.3% paste=16.2 parts by weight equivalent to 90% of the theory of the compound of the formula:

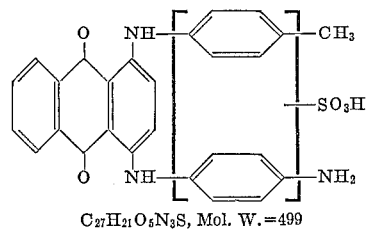

$C_{27}H_{21}O_5N_3S$, Mol. W.=499

Found: S=7.2%. Theory $C_{27}H_{21}O_5N_3S$:S=6.4%.

(b) A charge of 540 parts of water and 17.1 parts by weight of a 24.3% aqueous paste of monosulfated 1-(p-toluidino) - 4 - 4' - aminophenylamino) - anthraquinone (=4.15 parts 100%), prepared as described in (a) above was adjusted to a pH of 9 by the addition of 5% sodium hydroxide solution.

At 0–5° C. and at a pH range of 8–10, 2.55 parts by weight of fumaryl chloride was added to the charge during 2 hours alternatingly with 5% sodium hydroxide solution following the same procedure as described in Example 1.

The resulting dyestuff has the formula

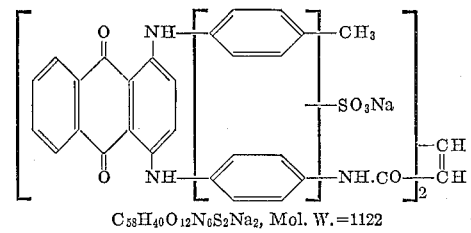

$C_{58}H_{40}O_{12}N_6S_2Na_2$, Mol. W.=1122

Weight obtained=4.7 parts by weight equivalent to 100% of the theory.

The green dyeings of this product were similar in fastness properties to the dyeings of the product of Example 1.

*Example 3*

A charge of 600 parts of water and 43.1 parts by weight of an 11.27% aqueous paste of monosulfonated 1-phenylamino-4-(4'-aminophenylamino)-anthraquinone (=4.85 parts 100%) prepared as described in Example 1(a) was adjusted to a pH of 9.7 by the addition of 5% sodium hydroxide solution.

A terephthaloyl chloride solution was prepared by refluxing for three hours a charge of 90 parts by volume (dry distilled) chlorobenzene, 9 parts by volume thionyl chloride, 3.3 parts by weight terephthalic acid, and a trace of pyridine (about 0.05 part by weight).

Finally an amount of 40 parts by volume of liquid (excess thionyl chloride and chlorobenzene) was distilled off leaving a solution of terephthaloyl chloride in chlorobenzene. At 0–5° C. and a pH range of 8–10 all of the terephthaloyl chloride solution was added to the above charge under vigorous agitation during two hours alternatingly with 5% sodium hydroxide solution. After all was added the charge was stirred at 0–5° C. for three hours more, adding from time to time more 5% sodium hydroxide solution to prevent the pH from falling below 8. After removal of the cooling bath the charge was stirred an additional 15 hours. A test dyeing remained green on addition of dilute sulfuric acid indicating the completion of the reaction. If the reaction is incomplete the dyeing will turn bluish.

The charge was finally steam distilled to remove all the chlorobenzene. After the steam distillation the pH was 9.7. It should be between 8 and 10 and has to be adjusted if found to be below 8. The dyestuff was precipitated by the addition of salt. In order to obtain it in a better filtrable form the mixture was heated to 90° C. and cooled again to 25° C. Then the dyestuff was filtered off and washed with cold water for removal of salt until the filtrate ran intensively green colored. Finally the dyestuff was dried. It has the formula

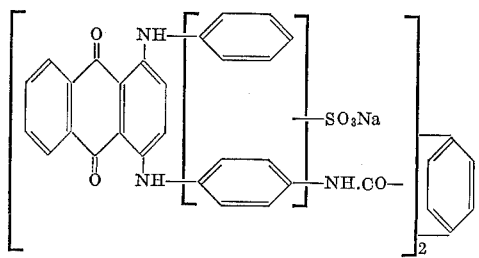

$C_{60}H_{38}O_{12}N_6S_2Na_2$, Mol. W.=1144

Weight obtained=4.7 parts by weight equivalent to 82% of the theory.

The green dyeing of this product on cotton was brighter and a little bluer against the dyeing of the dyestuff of Example 1. Resin finishing changed the shade a little bluer and brighter. The dyestuff is particularly suitable for rayon giving bright green shades of a lightfastness of about 30 hours under the fadeometer both for resin treated and untreated dyeings.

*Example 4*

A charge of 600 parts of water and 36.2 parts by weight of 13.4% aqueous paste of monosulfonated 1-phenylamino-4-(4'-aminophenylamino)-anthraquinone (=4.85 parts 100%) prepared as described in Example 1(a) was adjusted to a pH of 9.7 by the addition of 5% sodium hydroxide solution. A 4,4'-biphenyldicarboxylic acid chloride solution was prepared by refluxing for three hours a charge of 90 parts by volume (dry distilled) chlorobenzene, 9 parts by volume thionyl chloride, 4.8 parts by weight 4,4'-biphenyldicarboxylic acid, and a trace of pyridine (about 0.05 part by weight). Finally an amount of about 40 parts by volume of liquid (excess thionyl chloride and chlorobenzene) was distilled off leaving a solution of 4,4'-biphenyldicarboxylic acid chloride in chlorobenzene.

On cooling the solution to room temperature 4,4'-biphenyldicarboxylic acid chloride crystallized out partly. Enough chlorobenzene was added to keep the acid chloride dissolved at room temperature.

At 0–5° C. and at a pH range of 8–10 this solution was added to the above charge during about two hours alternatingly with 5% sodium hydroxide solution. After all was added the procedure was continued as described in Example 3. The resulting dyestuff has the formula

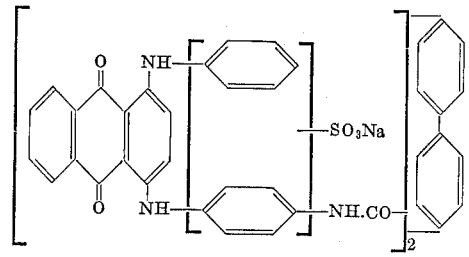

$C_{66}H_{42}O_{12}N_6S_2Na_2$, Mol. W.=1220

Weight obtained=6.0 parts by weight equivalent to 98% of the theory. The product dyed similar shades of green of similar fastness properties as compared with the dyestuff of Example 3.

*Example 5*

A charge of 600 parts of water and 36.2 parts by weight of 13.4% aqueous paste of monosulfonated 1-phenylamino-4-(4'-aminophenylamino)-anthraquinone (=4.85 parts 100%) prepared as described in Example 1(a) was adjusted to a pH of 9.6 by the addition of 5% sodium hydroxide solution.

A 4,4'-oxo-bis-benzoic acid chloride solution was prepared by refluxing for 3¾ hours a charge of 90 parts by volume (dry distilled) chlorobenzene, 9 parts by volume thionyl chloride, 3.9 parts by weight 4,4'-oxo-bis-benzoic acid and a trace of pyridine (about 0.05 part by weight). Finally an amount of about 40 parts by volume of liquid (excess thionyl chloride and chlorobenzene) was distilled off leaving a solution of 4,4'-oxo-bis-benzoic acid chloride in chlorozenzene.

This solution was reacted with the above charge as described in Example 3. The resulting dyestuff has the formula

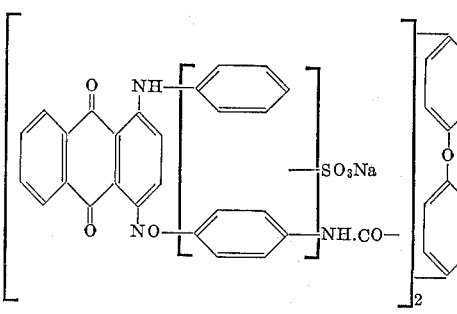

$C_{66}H_{42}O_{13}N_6S_2Na_2$, Mol. W.=1236

Weight obtained=6.2 parts by weight equivalent to 100% of the theory.

The green dyeings of this product were similar to the dyeings obtained with the dyestuff of Example 4.

This invention has been disclosed with respect to certain preferred embodiments, and there will become obvious to persons skilled in the art various modifications and variations thereof which are intended to be included within the spirit and purview of this invention and application and the scope of the appended claims.

We claim:
1. The product of the process which comprises
(1) reacting an intermediate of the formula

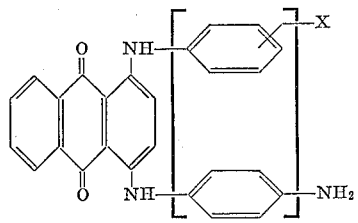

wherein X is H, lower alkyl, lower alkoxy, or halogen, with sulfuric acid of at least 96% concentration, including oleum, at temperatures of about 60–120° C. to introduce one —SO$_3$H group into one of the bracketed benzene rings and then
(2) reacting two moles of the resulting monosulfonated product with one mole of a dihalide of oxalic, maleic, malonic, fumaric, citraconic, adipic, butadiene-1,4-dicarboxylic, cumidic, isophthalic, terephthalic, azobenzoic, benzophenone-dicarboxylic, acetone-dicarboxylic, acetone-diacetic, cinnamic-carboxylic, diglycolic, pyridine-dicarboxylic, diphenic, diphenyldicarboxylic, succinic, isosuccinic, mesaconic, naphthalene-dicarboxylic, pyrotartaric, uvitic, or 4,4′-oxo-bisbenzoic acid; in an aqueous medium at a temperature of about −3 to +30° C. and a pH of about 7 to 11.5.

2. A product as defined in claim 1 wherein X is H, and the defined dihalide is fumaryl chloride.
3. A product as defined in claim 1 wherein X is CH$_3$ in para position relative to the imino linkage, and the defined dihalide is fumaryl chloride.
4. A product as defined in claim 1 wherein X is H and the defined dihalide is terephthaloyl chloride.
5. A product as defined in claim 1 wherein X is H and the defined dihalide is 4,4′-biphenyldicarboxylic acid chloride.
6. A product as defined in claim 1 wherein X is H and the defined dihalide is 4,4′-oxo-bis-benzoic acid chloride.

References Cited by the Examiner

UNITED STATES PATENTS

| | | | |
|---|---|---|---|
| 1,698,821 | 1/1929 | Olgilvie | 260—374 |
| 1,856,802 | 5/1932 | Bally et al. | 260—374 |
| 1,898,748 | 2/1933 | Shepherdson et al. | 260—374 |
| 2,091,812 | 8/1937 | Haddock et al. | 260—374 |
| 2,623,884 | 12/1952 | Peters et al. | 260—368 |
| 2,779,772 | 1/1957 | Frey | 260—368 |
| 2,824,093 | 2/1958 | Benz et al. | 260—374 |

OTHER REFERENCES

Houben, "Das Anthracene und die Anthrachinone," page 419 (1929).

LORRAINE A. WEINBERGER, *Primary Examiner.*

R. K. JACKSON, H. C. WEGNER, *Assistant Examiners.*